United States Patent
Labadie et al.

[11] 3,964,787
[45] June 22, 1976

[54] CHILD'S SAFETY CHAIR

[75] Inventors: Jean Francois Labadie; Armand R. Bernard; Olivier P. de la Taille, all of Etampes; Christian Thary, Lure, all of France

[73] Assignee: Etablissements Bertrand Faure, Le Chesnay, France

[22] Filed: Mar. 11, 1975

[21] Appl. No.: 557,343

[30] Foreign Priority Application Data
Mar. 15, 1974 France .................. 74.08866

[52] U.S. Cl. .................. 297/390; 297/216; 297/250
[51] Int. Cl.² .................. B60R 21/10; A62B 35/00
[58] Field of Search .......... 297/250, 255, 254, 390, 297/386, 216, 385, 384

[56] References Cited
UNITED STATES PATENTS

| | | | |
|---|---|---|---|
| 2,805,081 | 9/1957 | Frimet | 297/390 X |
| 3,279,817 | 10/1966 | Henry | 297/390 X |
| 3,424,497 | 1/1969 | Brilmyer et al. | 297/250 |
| 3,563,600 | 2/1971 | Converse | 297/254 |
| 3,606,453 | 9/1971 | Cicero | 297/385 |
| 3,635,526 | 1/1972 | Posey | 297/390 |
| 3,713,695 | 1/1973 | Von Wimmersperg | 297/216 |
| 3,784,224 | 1/1974 | Peeler | 297/390 |
| 3,794,379 | 2/1974 | Furey | 297/250 |
| 3,819,230 | 6/1974 | Bloom | 297/390 X |
| 3,861,742 | 1/1975 | Leonard et al. | 297/253 |
| 3,865,433 | 2/1975 | Stafford | 297/390 |

*Primary Examiner*—James T. McCall
*Attorney, Agent, or Firm*—Oblon, Fisher, Spivak, McClelland & Maier

[57] ABSTRACT

A child's safety chair for vehicles includes a seat member, and a retaining member disposed in front of the seat member, the retaining member having defined within the lower portion thereof a passageway through which the child's legs may pass. The retaining member has a height and width substantially the same as that of the seat member so as to restrain substantially the entire torso of the child under deceleration conditions of the vehicle, and is also separable from the seat member and variably adjustable in its disposition relative thereto whereby different sized children may be accommodated within the safety chair.

3 Claims, 2 Drawing Figures

CHILD'S SAFETY CHAIR

The present invention relates to a child's safety chair comprising a retaining member in front of the seat, having in its upper part an opening for the child's legs and on its front face a recess for a safety-belt.

The seat and the retaining member constituting such chairs are at present made in a single block so as to ensure proper rigidity and especially a proper resistance to deformation in case of shocks. Unfortunately, these chairs do not give entire satisfaction. In fact, it is not easy to fit them into a car. Moreover, because of their bulk, it is not easy to stow them in the boot of a car. In addition, placing a child on the seat poses numerous problems, particularly because of the limited space available for the child to pass his legs through the opening provided in the retaining member. Finally, these seats can only be used for children in a relatively narrow age range.

The present invention seeks to remedy these disadvantages by providing a child's safety chair which is characterized by the fact that the retaining member and the seat constitue two distinct units connectable by means enabling the retaining member to be moved away from the seat.

This arrangement allows an easier mounting of the chair inside a car. It is in fact evident that, when they constitute two distinct units, the seat and the retaining member can be more easily introduced into a car than when they constitute a single block. Moreover, it is easier to stow them in the boot of a car. In addition it is easier to place a child on such a seat since it is sufficient to put him on the seat and then to fit the retaining member thereto. Thus, the child is secured and cannot get out of the seat by himself.

Advantageously, the chair of the present invention comprises means for adjusting the distance of the retaining means from the seat, which enables the chair to be used for children of a wider age range.

According to a preferred embodiment, the means for moving the retaining means away from the seat comprise rods fitted in opposing apertures provided in the side walls of the seat and in the retaining means. The fitting together of the retaining means and the seat is therefore easy and rapid. It will be noted moreover that the rods can be withdrawn from their apertures to facilitate stowing the constituent parts of the chair.

As for the means for adjusting the distance between the retaining means and the seat, they consist of packing-pieces which can be fitted on the rods between the seat and the retaining member.

An example of one embodiment of the present invention is shown in the accompanying drawings in which.

Figure 1:
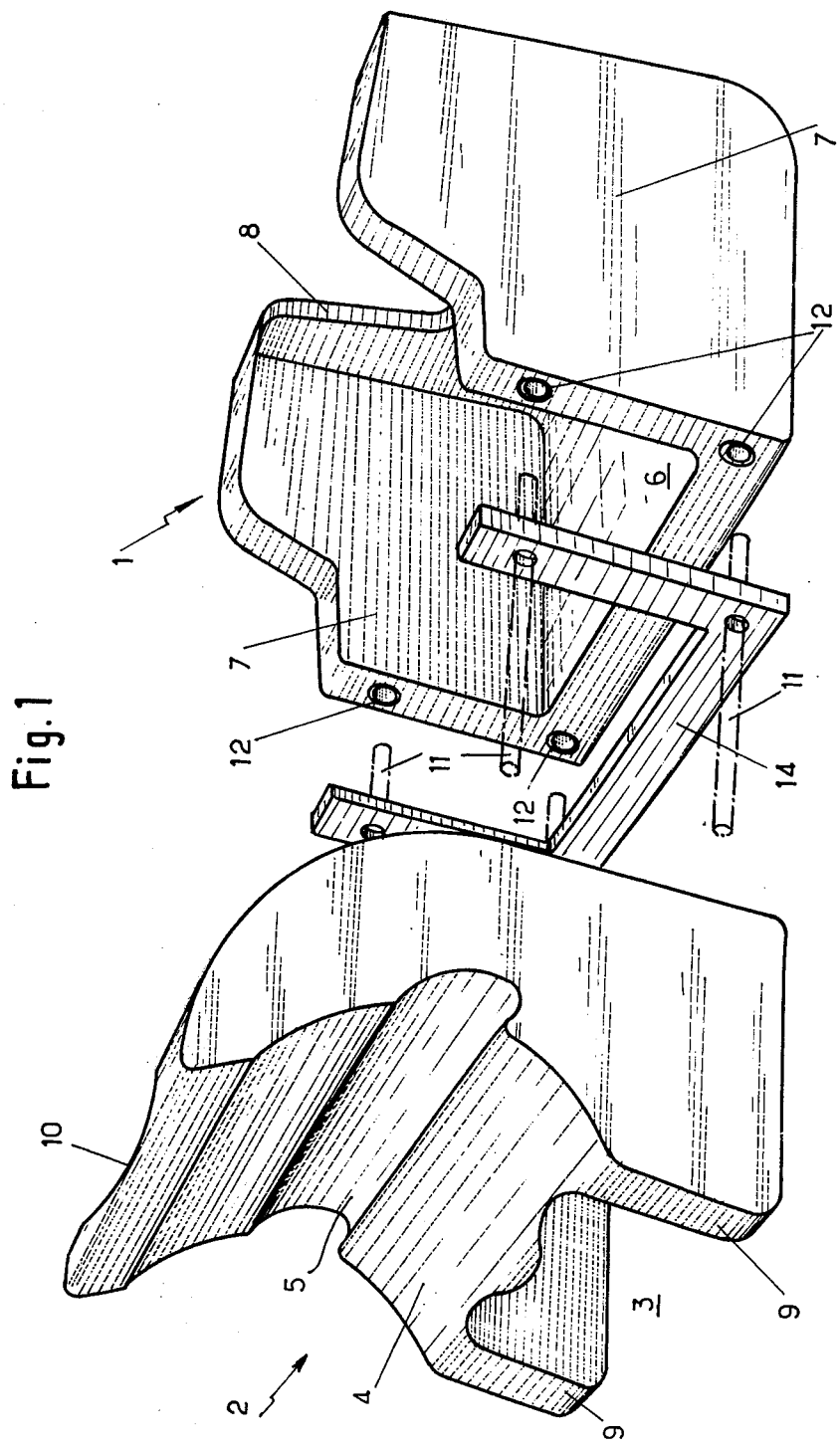
FIG. 1 is an exploded perspective view of a chair according to the present invention.

The child safety chair provided by the present invention has a seat 1 in front of which is provided a retaining member 2 having, in its lower part, an opening 3 for passing a child's legs through and on its front face 4, a recess 5 for receiving a safety-belt.

The seat 1 includes essentially a bottom 6 on which the child sits, two side walls 7 and a back 8. It will be noted that for normal use of the chair, the bottom 6 rests on a car seat fitted with a safety-belt, while the back 8 leans against the back of said car-seat.

Turning now to the retaining member 2, it comprises two side uprights 9, defining the width of opening 3, joined at the upper part thereof. They are spaced corresponding to the distance separating the sidewalls 7 of the seat. It will be noted moreover that the near face of the retaining member is curved forwards, the curvature being chosen so that the child will at best be held during a fierce deceleration. Of course an appropriate coating can be provided on face 10 to absorb the shocks to avoid hurting the child.

In accordance with the present invention, the retaining means and the seat constitute two distinct units connected by means allowing the retaining means to be moved away from the seat.

Figure 2:
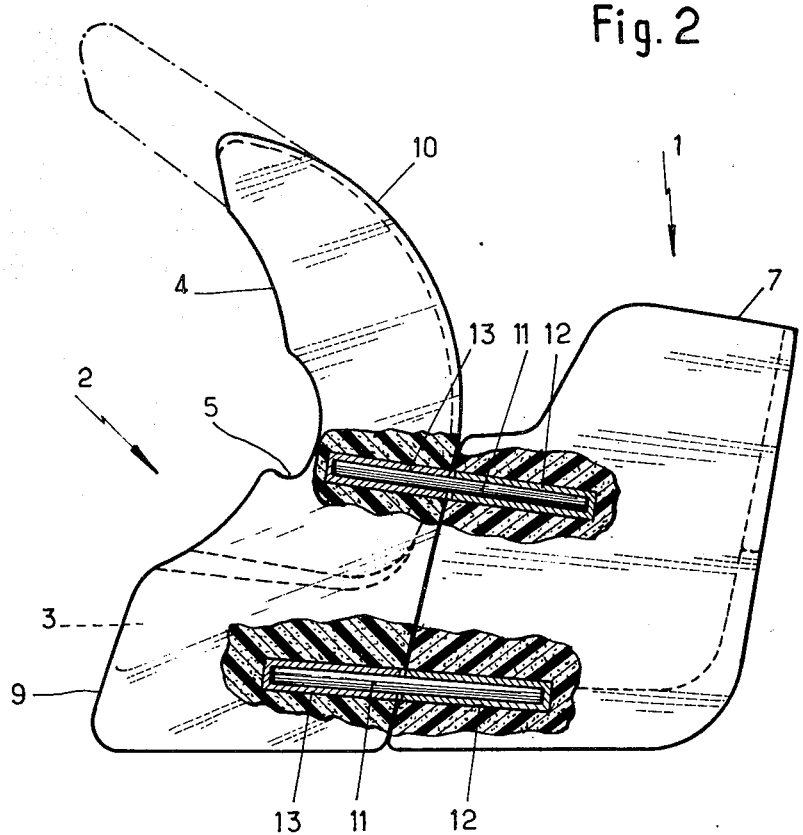
FIG. 2 is a side view showing, partly in section, the assembled seat and retaining member.

With reference to FIG. 2, these means comprise rods 11 fitted in opposing apertures 12 and 13 provided in the side-walls 7 of the seat and in the uprights 9 of the retaining means 2.

It is evident that with these means it is possible to remove the retaining means from the seat to provide a space sufficient for placing a child in, or taking him from the seat.

Referring now to FIG. 1, it can be seen that the chair of the invention can furthermore be provided with means for adjusting the distance from the retaining means to the seat, these means consisting of a set of packing-pieces, such as packing-piece 14, which is fitted on rods 11 between the seat and the retaining means.

Thus, by simply choosing the packing-piece to use, the chair can always be adapted to the size of the child.

The chair of the present invention is meant for cars fitted with safety-belts. In use, seat 1 is first placed on a car-seat fitted with a safety-belt and the child is placed on this seat 1. Since the child's seat takes up little room and is completely unrestricted on its front face, no difficulty is encountered either when fitting it in the car or when placing a child in it.

Then rods 11 are inserted in the apertures 12 and the retaining member is fitted on the seat by fitting the protruding ends of these rods in the apertures 13. It will be noted that meanwhile, the child's legs extend into the opening 3 without being disturbed. If necessary, a packing-piece 14 could of course be used to adapt the chair to the size of the child.

Finally, to secure the chair of the invention on the car-seat, the safety-belt is fastened while making sure that it passes in the recess 5 provided on the front face of the retaining member.

During a fierce decelaration, the child is thrown forward, but he is protected, for his chest comes against the near face 10 of the retaining member whose material and shape absorb the shock.

Of course, the upper part of the retaining member could be shaped, as shown in broken lines on FIG. 2, so that the chest and head of the child are both held.

It is to be noted that the straps which up to now were provided on other such safety-chairs, have been eliminated for they injure the child more or less seriously when an accident occurs.

What we claims is:

1. A child's safety chair for vehicles, comprising:
   a seat member;
   a retaining member disposed in front of said seat member and having within the lower portion thereof means defining an opening through which a child's legs may pass, said retaining member being separable from said seat member and having a height and width substantially the same as that of said seat member so as to restrain substantially the entire torso of a child under deceleration conditions of the vehicle; and means interposed between said seat member and said retaining member for facilitating movement of said retaining member away from said seat member and for variably adjusting the distance between said seat and retaining members whereby different sized children may be accommodated within said safety chair.

2. A child's safety-chair as claimed in claim 1, characterized in that the means enabling the retaining means to be moved away from the seat comprise rods fitting in opposing apertures provided in sidewalls of the seat and in the retaining means.

3. A child's safety chair as claimed in claim 2, characterized in that the means enabling the distance between the retaining means and the seat to be adjusted comprise sets of packing-pieces which can be fitted onto the rods between the seat and the retaining means.

* * * * *

UNITED STATES PATENT AND TRADEMARK OFFICE
CERTIFICATE OF CORRECTION

PATENT NO. : 3,964,787
DATED : June 22, 1976
INVENTOR(S) : Jean Francois Labadie et al It is certified that error appears in the above-identified patent and that said Letters Patent are hereby corrected as shown below:

Column 1, line 6, delete "upper" and insert therefor --lower--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*